Jan. 6, 1970 T. C. J. L. STAAR 3,488,058

MECHANISM FOR TAPE DECKS

Filed Oct. 12, 1966 6 Sheets-Sheet 1

INVENTOR

THEOPHIEL CLEMENT JOZEF LODEWIJK STAAR by: Wolfe, Hubbard, Voit & Osann

ATTYS.

MECHANISM FOR TAPE DECKS

Filed Oct. 12, 1966 6 Sheets-Sheet 2

INVENTOR
THEOPHIEL CLEMENT JOZEF LODEWIJK STAAR
by: Wolfe, Hubbard, Voit & Osann
ATTYS.

Jan. 6, 1970 T. C. J. L. STAAR 3,488,058

MECHANISM FOR TAPE DECKS

Filed Oct. 12, 1966 6 Sheets-Sheet 3

INVENTOR
THEOPHIEL CLEMENT JOZEF LODEWIJK STAAR
by: Wolfe, Hubbard, Voit & Osann
ATTYS.

INVENTOR
THEOPHIEL CLEMENT JOZEF LODEWIJK STAAR
by: Wolfe, Hubbard, Voit & Osann
ATTYS.

INVENTOR
THEOPHIEL CLEMENT JOZEF LODEWIJK STAAR by: Wolfe, Hubbard, Voit & Osann
ATTYS.

INVENTOR
THEOPHIEL CLEMENT JOZEF LODEWIJK STAAR by: Wolfe, Hubbard, Voit & Osann
ATTYS.

United States Patent Office 3,488,058
Patented Jan. 6, 1970

3,488,058

MECHANISM FOR TAPE DECKS

Theophiel Clement Jozef Lodewijk Staar, Kraainem, Belgium, assignor to S.A. Staar, Brussels, Belgium, a corporation of Belgium Filed Oct. 12, 1966, Ser. No. 586,101
Claims priority, application Belgium, June 7, 1966, 30,490; Sept. 7, 1966, 33,056
Int. Cl. G11b *5/00*
U.S. Cl. 274—4 4 Claims

ABSTRACT OF THE DISCLOSURE

An operating mechanism for the control of the tape drive elements and function control elements of a cassette-type tape deck is described in which a shiftable drive carriage is mounted on a parallelogram linkage for rising vertical engagement with an inserted cassette, and abutments are placed with respect to shiftable lines on the drive carriage to affect the desired control function through the shifting movement of the drive carriage.

This invention relates generally to apparatus for the recording and playback of sound from a magnetic tape in a self-contained cartridge or cassette. More particularly, the invention concerns tape recorder mechanisms which are adapted to receive a tape cartridge in engagement with a shiftable carriage which is translated to bring drive elements into engagement with the tape.

An important advantage of cartridge-loading tape recorders is that loading and removing the tape from the machine is greatly simplified. Magnetic tape is commonly stored in one of two reels within the cartridge, and during operation the tape is carried past a recording or playback sound head to a second reel, on which it is stored. When the tape has been transferred to the second reel during the playing of one band or track, the cartridge may commonly be released from the machine, reversed, and a second band or track of recorded material played as the tape is run back to the first reel. Certain driving elements of the tape deck mechanism must therefore enter the cartridge to provide means for controllably driving the tape past the sound head. If the commonly-used capstan and pinch roller drive system is employed, one of these elements must penetrate the cartridge to engage the tape. Tape transport and control spindles must also enter the reel hubs of the cartridge to provide tensioning for the supply reel and driving force for the takeup reel when the machine is in operation.

To receive the cartridge and accurately guide the various drive elements into engagement with the tape and reels as the cartridge is brought into position with respect to the sound head, a shiftable drive carriage carrying the drive motor, capstan and reel spindles has been successfully utilized. A tape deck incorporating such a drive carriage and associated mechanism is disclosed in my co-pending application for a Tape Deck, Ser. No. 567,115, filed July 22, 1966 issued as U.S. Patent No. 3,385,534.

Briefly stated, use of a shiftable drive carriage which carries the drive motor, capstan and reel spindles into engagement with the tape cartridge provides several important advantages in the operation of the tape deck. The various drive elements may be engaged with their corresponding openings in the tape cartridge with substantially vertical penetration as the drive carriage rises into engagement with the tape cartridge as the cartridge is inserted into operating position. The design and construction of the drive train for powering the various drive elements is considerably simplified for the reason that all the drive elements are located on the same plane as the drive motor, and the various elements need not be shiftable relative to one another. Other advantages of convenience and ease of operation are realized through the simplified manner in which the tape cartridge may be directly inserted into the deck instead of having to be lowered in place over protruding drive elements in some manner.

In the construction of tape decks embodying the shiftable drive carriage described above, other functions must be provided which, because of the departure from conventional design, do not lend themselves to construction in the usual way. For example, when the tape deck is operated in the normal recording or playback modes of operation, a tape control system must be provided to controllably tension the tape drawn from the supply reel by the capstan and pinch roller, and to similarly wind the tape on the takeup reel as it is drawn past the sound head. When rapid tape transport means are included, the rapid rotation of the tape supply reel must be arrested before normal operation is resumed to prevent overrun and jamming. For convenience of reference, the present application uses the term "takeup drive" to describe the powered winding function of the takeup reel spindle in storing the tape after it has been drawn past the sound head by the capstan and pinch roller. The term "reel brake" is used to describe the means by which the tape supply reel is restrained from overrunning.

While these functions may be provided in the manner disclosed in my U.S. Patent No. 3,385,534, previously mentioned, the system disclosed does not provide for rapid rewind or fast forward tape transport functions. When such functions are provided, as disclosed in my co-pending application for a Tape Cartridge Positioning and Driving Apparatus, issued as U.S. Patent No. 3,429,519, these tape control functions must be disengaged each time the rapid transport functions are used to allow the tape reels to be rapidly rotated in transporting the tape forward or backward as desired by the operator.

Also involved in the construction of more sophisticated tape deck mechanisms is the provision of a recording function. In this mode of operation, the tape deck is used to record sound information on the magnetic tape instead of merely playing back prerecorded material as is more generally the case. With a tape deck which is capable of both recording and playback functions, considerable care must be exercised by the operator in order to avoid accidentally erasing and re-recording over a section of tape already containing recorded material. If care is not taken, a valuable recording may be inadvertently ruined because the operator may have forgotten to switch the electronic circuits of the machine from the "record" to the "playback" settings. For this reason, many tape recorders have an interlock which requires the operator to consciously perform two simultaneous functions in order to cause the machine to operate in the record mode. The interlock may take the form of an extra push-button which must be depressed in order to allow the record mode switch to be actuated, for example. Such systems as this, however, are not generally adaptable to a simplified machine of the type herein considered in which the playing of the tape deck is initiated merely by the insertion of a cartridge by the operator.

In view of the foregoing, it is a primary object of the present invention to provide a tape deck operating mechanism for tape decks of the type having a shiftable drive carrying drive elements into engagement with a tape cartridge, which mechanism is effective to actuate other functional elements of the tape recorder through the act of the operator in inserting a tape cartridge into operating position. In particular, it is an object to achieve a tape deck operating mechanism for tape decks of this description which is effective to actuate the takeup reel drive and supply reel brake functions when required, while disengaging those functions during the operation of rewind or fast forward tape transport functions.

Also, in a tape deck operating mechanism for tape decks employing a shiftable drive carriage as previously described and which is capable of both recording and playback modes of operation, it is a further object to provide a lockout which is effective to lock out the record mode of operation unless and until the lockout is intentionally defeated by the operator. Related to this object is the provision of a lockout which is automatically responsive to interruption of the recording process either through engagement of either the rewind or fast forward functions, or responsive to unlatching the drive carriage to release the tape cartridge from its operating position.

Another problem that has been found with tape decks of the type described which employ a shiftable drive carriage, is unwanted motion of the drive carriage when resiliently held in the released position. This problem is present particularly with portable units containing such tape decks or with tape decks installed in a vehicle or the like, when unwanted motion of the drive carriage occurring while the portable units are carried about or while the vehicle is in motion creates noise and may result in damage to the components of the tape deck. Accordingly, it is a further object of the present invention to provide in a tape deck operating mechanism of the type described, a latching mechanism which is effective to latch the drive carriage in the released position. It is a related object to provide for automatically releasing the latching mechanism responsive to the insertion of a cartridge into the tape deck, and for automatically re-engaging the latching mechanism when the cartridge is ejected.

Other objects and advantages of the invention will become apparent upon reading the following detailed description and upon reference to the drawings in which.

While the invention will be described in connection with preferred and alternative embodiments, it will be understood that the invention is not limited in applicability to those embodiments, but is equally applicable to alternative and equivalent constructions.

Figure 1:
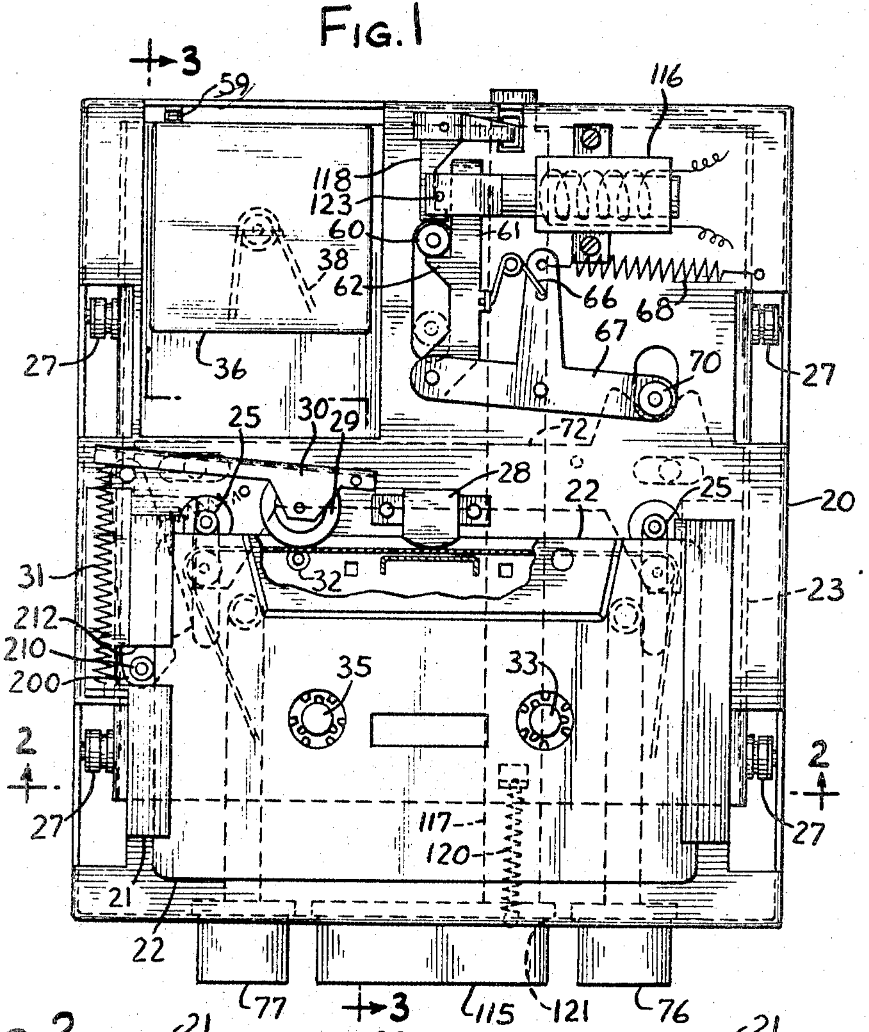
FIGURE 1 is a plan view of the tape deck mechanism of the present invention with a tape cartridge shown in position for recording or playback, and with the associated electronics and exterior covers of the machine being omitted for clarity.
Figure 2:
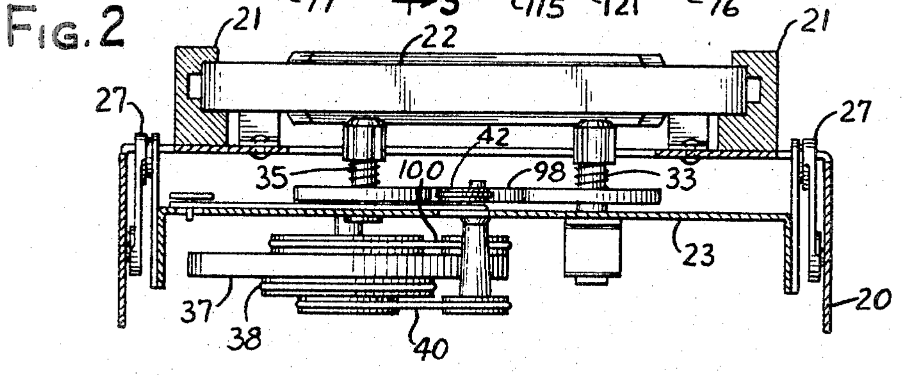
FIG. 2 is a section taken in the plane 2—2 of FIGURE 1.

Turning to the drawings, there is shown in FIG. 1 a tape deck constructed according to the present invention. The principal features and method of operation of the tape deck in general will be briefly described as they relate to the present invention, but for a more detailed description the reader is referred to my U.S. Patent No. 3,385,534, previously mentioned.

Figure 3:
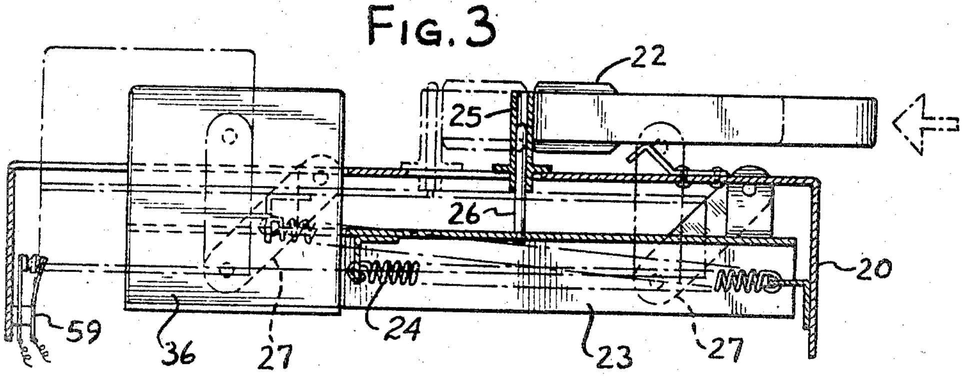
FIG. 3 is a section taken in the plane 3—3 of FIGURE 1, with the shifted position of the drive carriage being shown in phantom.

The tape deck drive mechanism comprises a fixed frame or chassis 20 to which are attached guides 21 having grooves or slots into which a tape cartridge 22 may be introduced by the operator. The driving elements of the tape deck are carried by a movable frame or drive carriage 23 disposed beneath the chassis 20 and moveable against return springs 24 (FIG. 3) so that the drive elements enter into penetrating engagement with the tape cartridge 22 when the latter is inserted into operating position.

As the carriage 22 slides into operating position, it is guided by the guides 21 into engagement with a pair of upright lugs 25 and drives them forward in their slots in the chassis 20. The lugs 25 are hollow and contain slidable pins 26 which extend upwardly from the drive carriage 23. Each lug 25 is provided with a flange at its base to confine its movement to a path coplanar with the movement of the cartridge 22 in the guides 21. When moved forward by the motion of inserting the cartridge 22, the lugs 25 cause the drive carriage 23 to swing in the direction of cartridge movement with a rising motion which causes the various drive elements to penetrate the respective openings of the cartridge 22 and become operably engaged therewith. This motion is accomplished solely by the drive carriage 23, with the cartridge 22 being restricted by the guides 21 to a direct in-and-out movement in a single lateral plane.

The drive carriage 23 is suspended from the chassis 20 by four links 27, which are pivoted at each end to form an articulated parallelogram linkage which is deformed on insertion of the cartridge 22 to swing with a rising motion in the direction of cartridge movement. As the cartridge 22 is introduced, contact with the lugs 25 and slidable pins 26 causes the drive carriage 23 to move upward and forward with a movement coinciding exactly with that of the cartridge so that if the cartridge 22 is taken as a point of reference, the drive elements rise vertically into the cartridge 22 with no relative lateral movement whatever.

A sound head 28 and a pinch roller 29 are carried by the chassis 20 and do not move with the drive carriage 23. The pinch roller is journalled to a pivoted arm 30 which is tensioned by a spring 31. It will be understood that while a single sound head 28 is shown in the present embodiment, a plurality of sound heads including a recording head, reproducing head and an erase head could be employed in the same manner with equal success. Other sound components, including power supply, amplifier and speakers (not shown) are also mounted independently of the drive carriage 23.

Carried by the drive carriage 23 are the drive components by which the tape is driven and controlled within the cartridge 22. A capstan 32 engages the tape against the pinch roller 29 (FIG. 1) to draw the tape past the sound head 28. In addition, the supply and takeup reels within the cartridge 22 are engaged by a supply reel spindle 33 and a takeup reel spindle 35 respectively which are also carried by the drive carriage 23.

Figure 6:
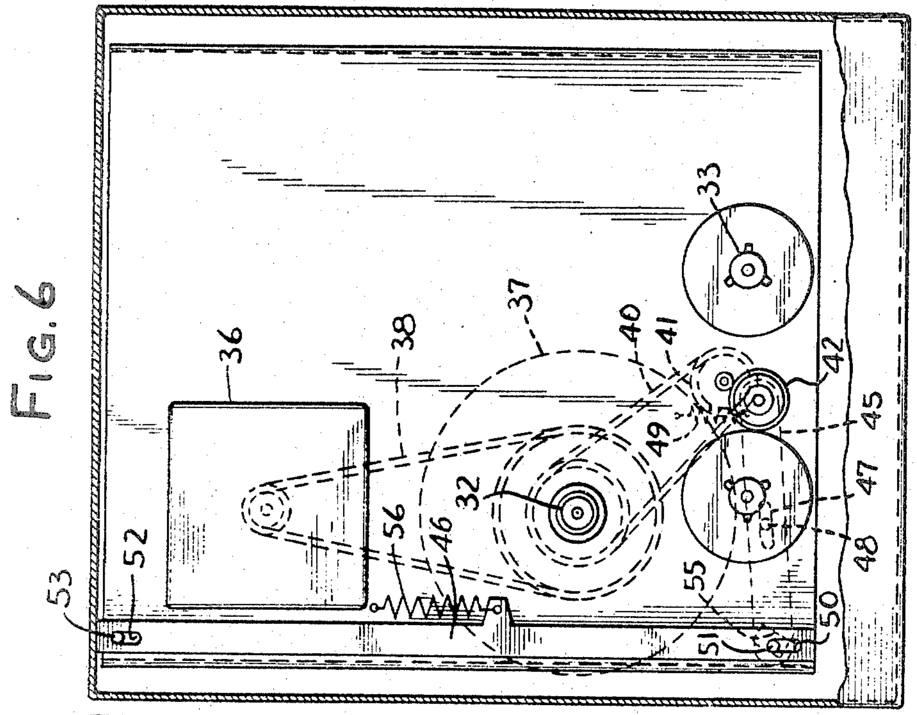
FIG. 6 is a fragmentary partial section similar to FIG. 5 with the takeup reel drive being engaged.
Figure 5:
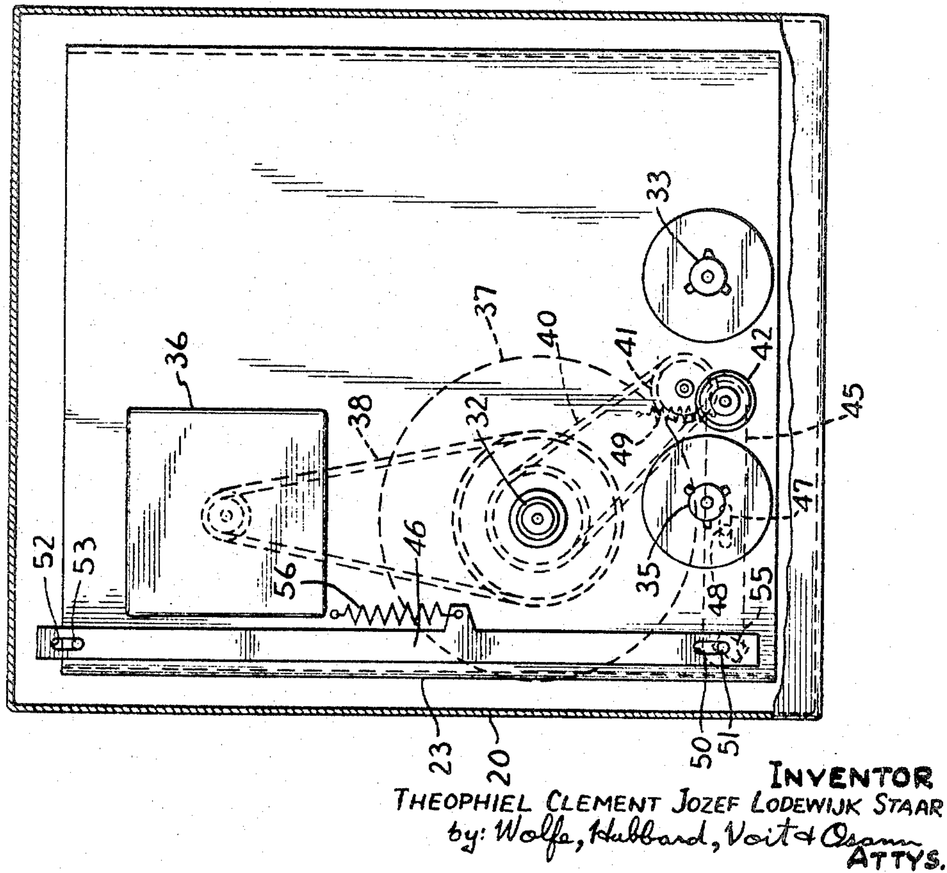
FIG. 5 is a fragmentary partial section of the motor and drive train for powering the capstan and reel spindles and illustrating the takeup reel drive of the present invention prior to engagement.

A drive motor 36 is also fixed to the drive carriage 23 and shifts in unison with the other drive elements. The drive motor 36 powers both the capstan 32 and the takeup reel spindle 35, while the supply reel spindle 33 is frictionally restrained to tension the tape slightly as it is drawn past the sound head 28. As shown in FIGS. 5 and 6, the capstan 32 is directly secured to a flywheel 37 which is driven from the drive motor 36 by a first drive belt 38. Since these elements are at all times fixed relative to one another, a simplified drive train is achieved. Insertion of a tape cartridge 22 by the operator causes the drive carriage 23 to simultaneously engage the cartridge 22 and shift in unison with it to the operating position (FIG. 1) in which various tape drive elements are effective to drive the tape past the sound head 28. As the drive carriage 23 reaches the operating position at the end of its travel (FIG. 3), it actuates a switch 39 which energizes the drive motor 36 and commences the playback or recording of the tape.

It is a principal feature of the invention that as the drive carriage shifts between its released position and its various auxiliary positions, an operating mechanism is actuated by which the functional operation of the tape deck is controlled. By the provision of the control mechanism of the present invention which depends for its operation on the relative movement between the drive carriage 23 and the frame 20 of the tape deck, supplementary control operations are avoided and the proper timing of the various functional operations is assured. Several exemplary embodiments of this control mechanism are described herein. Each control function of the mechanism has the common characteristic that it depends for its proper functioning, be it simultaneously or in sequence with other functions, on accurate coordination with other functions and the position of the tape cartridge and drive carriage 23.

In the first embodiment, the desired function which is accomplished by means of the invention is the sequential operation of the takeup reel drive when the tape deck is placed in operation for recording or playback. For this purpose, a second drive belt 40 powers a takeup power roller 41 which, in turn, drives the takeup reel spindle 35 through a selectively interposable friction wheel 42. The friction wheel is interposed in driving relationship with the hub of the takeup reel spindle 35 (FIG. 6) only when the drive carriage 23 and cartridge 22 are in operating position for recording or playback (FIG. 1). During rewind and fast forward functions as well as when the drive carriage 23 is released, the friction wheel 42 is also withdrawn (FIG. 5) to allow the takeup reel spindle 35 to rotate freely.

For the purpose of disengaging the friction wheel 42 from the takeup spindle 35 when the drive carriage is not in operating position for recording or playback, the friction wheel 42 is carried by a pivoted link 45 which is connected at its opposite end to an actuating link 46. The pivoted link 45 is provided with an elongate hole 47 which engages a pivot pin 48 fixed to the drive carriage 23. An interposing spring 49 tends to center the friction wheel 42 in proper driving engagement. The actuating link 46 is also provided with an elongate hole 50 which engages a corresponding pin 51 on the pivoted link 45, and is constrained at its opposite end by another elongate hole 52 and pin 53. To allow the friction wheel 42 to be freely interposed in driving position between the power roller 41 and takeup reel spindle 35, an enlarged hole 55 is provided in the drive carriage 23 to constrain the movement of the pin 51 while allowing it sufficient freedom of movement in all directions so as not to impede the movement of the friction wheel 42 in centering itself.

A return spring 56 is provided to urge the actuating link 46 toward the rear of the chassis 20 as viewed in FIG. 5. The pivoted link 45 is thereby swung about its pivot 48, lifting the friction wheel 42 against the spring 49 and away from engagement with the takeup reel spindle 35. When the drive carriage 23 is shifted into operating position as shown in FIG. 6, however, the actuating link 46 encounters the chassis 20 which acts as an abutment. The actuating link 46 is displaced away from its normal position in a manner which frees the pivoted link 45 to be shifted by the interposing spring 49, thereby interposing the friction wheel 42 between the power roller 41 and the takeup reel spindle 35. Because of the various elongate holes 47, 50, the pivoted link 45 and attached friction wheel 42 are free to shift under the urging of the spring 49, thereby allowing the friction wheel 42 to accommodate itself in proper driving relationship.

It is desirable that the torque exerted by the takeup reel spindle 35 on the tape be substantially constant, regardless of the speed of rotation or of the diameter of the coiled tape on the reel. For this reason the drive surfaces of the takeup reel spindle 35 and rollers 42 are preferably made of material which will accommodate a degree of slippage when driven by the friction wheel 42, thereby allowing a continuous overrun which results in the desired torque characteristics for the takeup spindle 35.

Figure 4:
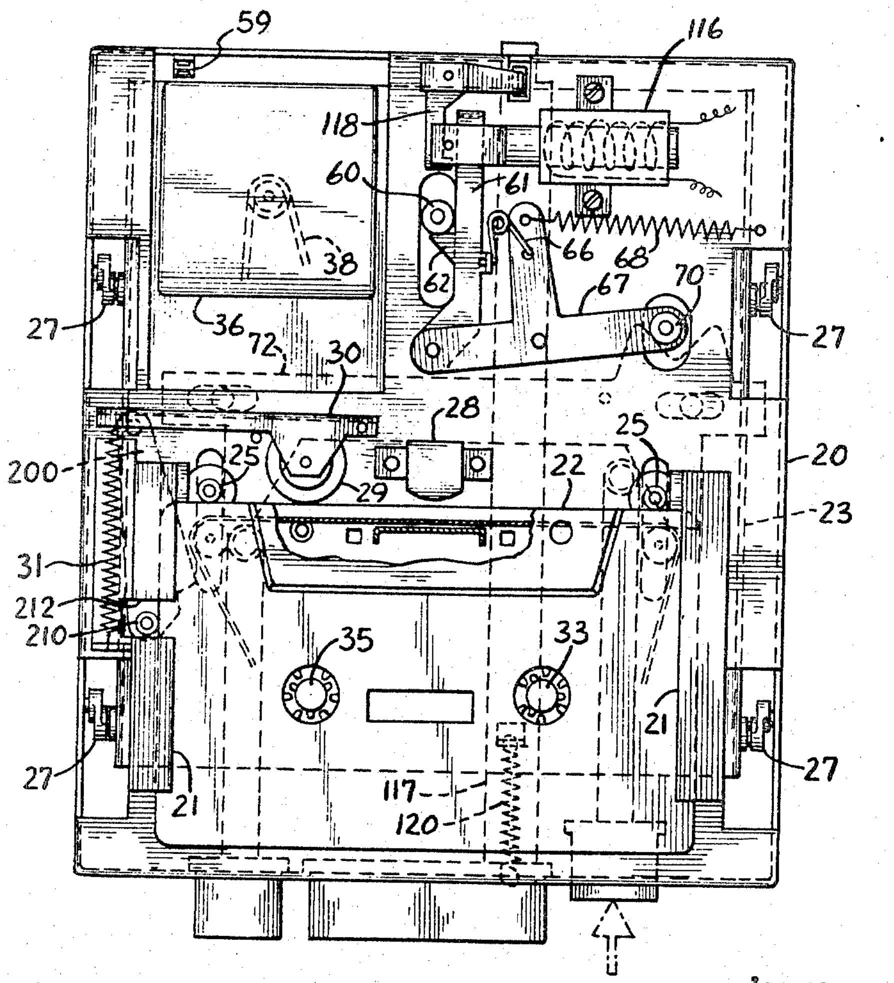
FIG. 4 is a plan view of the tape deck of FIGURE 1 with the cartridge and drive carriage momentarily shifted while rewinding the tape.
Figures 7, 8, 9:
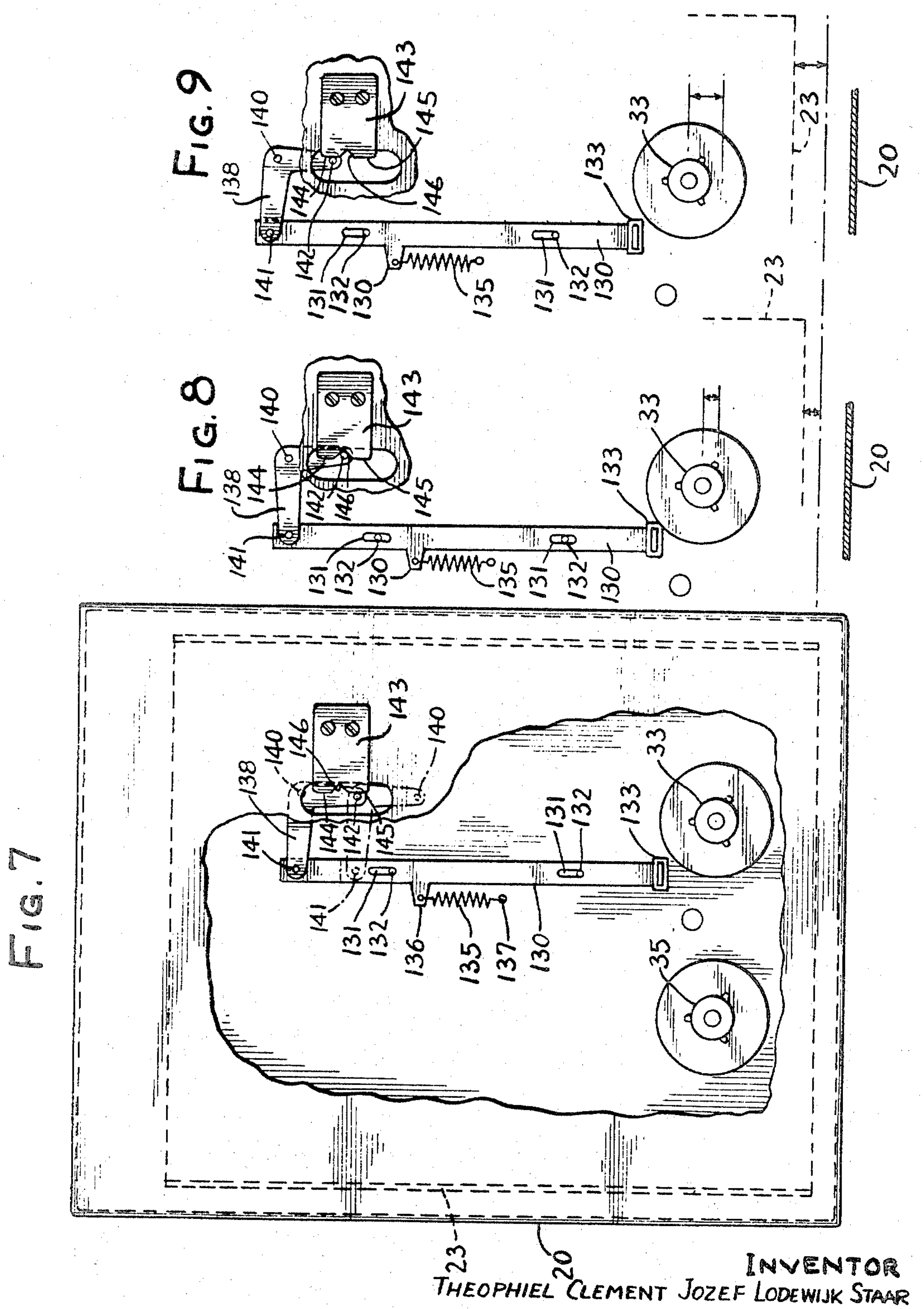
FIG. 7 is a fragmentary partial section of the tape deck illustrating the reel brake mechanism of the present invention.
FIG. 8 is a fragmentary view similar to FIG. 7, illustrating the reel brake as engaged during shifts from one operating position to another.
FIG. 9 is a fragmentary view similar to FIG. 8, illustrating the reel brake as disengaged during playback or recording.

In a second embodiment of the invention, there is shown in FIGS. 7, 8 and 9 a mechanism whereby the supply reel of the cartridge 22 may be braked whenever the drive carriage 23 passes between the operating position (FIG. 1) and the position of momentary retraction (FIG. 4) which is utilized during the operation of the fast forward and rewind tape transport functions. It will be appreciated that the latter operations involve tape transport at a relatively rapid rate which may cause the reel spindles 33, 35 to acquire considerable rotational velocity. This rotating speed must be dissipated when the drive carriage 23 is again returned to the operating position to permit recording or playback in order to avoid jamming and tape breakage because of overrun.

The takeup reel spindle 35, as previously described, is normally powered by the friction roller 42 when the drive carriage 23 is in the operating position. Because the friction roller 42 is made of material which will accommodate a degree of slippage, its effect upon initial engagement after a period of fast rotation of the reels, because it is driven forward at a relatively slow speed, is that of a brake. This serves to accomplish the required braking functions for the takeup reel spindle 35, thereby eliminating the need for a separate reel brake for this purpose.

The supply reel spindle 33, however, requires a separate braking mechanism. This reel brake is preferably engaged whenever the drive carriage 23 is shifted away from a position in which the supply reel may have been in relatively rapid rotation. In most cases, this position of rapid rotation comprises the intermediate position (FIG. 4) in which the fast forward or rewind functions are operative. During the performance of these functions, it is also desirable that the brake be disengaged to eliminate the power-absorbing friction that would otherwise be present during these operations. For the same reason, the brake is desirably disengaged during the normal recording and playback operations of the tape deck, with the required tape tension being supplied frictionally by the rotation of the supply reel within the cartridge 22. It may thus be seen that the reel brake mechanism must act in synchronism with the movement of the drive carriage 23 in shifting between its various positions to insure the proper operation of the tape deck mechanism.

With respect to the reel brake mechanism, it is therefore a feature of the invention that it is sequentially operated so that braking effect is achieved only upon the shifting of the drive carriage 23 through the intermediate position (FIG. 4) in which the fast forward or rewind tape transport functions are operative. For achieving this end, an actuating link 130 is provided which is shiftable along its axis by means of a pair of elongate holes 131 which engage corresponding pins 132 carried by the shiftable drive carriage 23. At one end of the actuating link 130 is a friction-producing rubber brake pad 133 which is urged into frictional engagement with the hub of the supply reel spindle 33 by a spring 135. The spring 135 is anchored at one end to a lug 136 on the actuating link 130 and at the other end to a hole 137 in the drive carriage 23. It will be seen that the actuating link 130 therefore shifts with the drive carriage 23, as does the rest of the drive mechanism as previously described.

At the end of the actuating link 130 opposite the brake pad 133, there is connected a shifting link 138 which is pivoted at its center 140 to the drive carriage 23, and connected by a pin 141 to the actuating link 130. At the other end of the shifting link 138 is a follower 142 which, in this embodiment, comprises a simple upright pin. The follower pin 142 engages a cam 143 which, unlike the rest of the drive mechanism, comprises an abutment by being secured to the frame 20 instead of the drive carriage 23. It may be seen, therefore, that the shifting of the drive carriage 23 causes the attached reel brake mechanism including the actuating link 130, shifting link 138 and follower pin 142 to move relative to the cam 143 in a manner which causes the follower pin 142 to follow the profile of the cam.

The cam profile is preferably formed with two peaks 144, 145 flanking a depression 146. The cam 143 is positioned such that the follower pin 142 comes to rest on the peak 144 when the machine is in opening position for recording or playback (FIG. 9) thereby disengaging the brake 133. When the drive carriage 23 is shifted momentarily forward for the rapid tape transport functions (FIG. 4), the follower pin passes through the depression 146 and comes to rest on the forward peak 145 (FIG. 7). The follower 142 is thereby caused to pass through the depression 146 whenever the drive carriage 23 is shifted between tsese two operating positions. In the same manner, the follower pin 142 is allowed to drop away from the peak 145 as the cartridge 23 is shifted to the release position, as indicated in phantom in FIG. 7.

The reel brake 133, therefore, is caused to be disengaged from the supply reel spindle 33 whenever the follower pin 142 rests at one of the peaks 144, 145 of the cam 143. Since these peaks 144, 145 correspond with the operating posiitons of the tape deck for recording, playback and rapid tape transport, the frictional effect of the reel brake 133 is removed during these operations. However, when the operations are terminated by shifting of the drive carriage 23 from one operating position to another or to the released position, the reel brake 133 is momentarily engaged as the follower pin 142 drops away from the peaks 144, 145 and allows the spring 135 to draw the brake pad 133 into frictional contact with the hub of the supply reel spindle 33.

Figures 10, 11, 12:
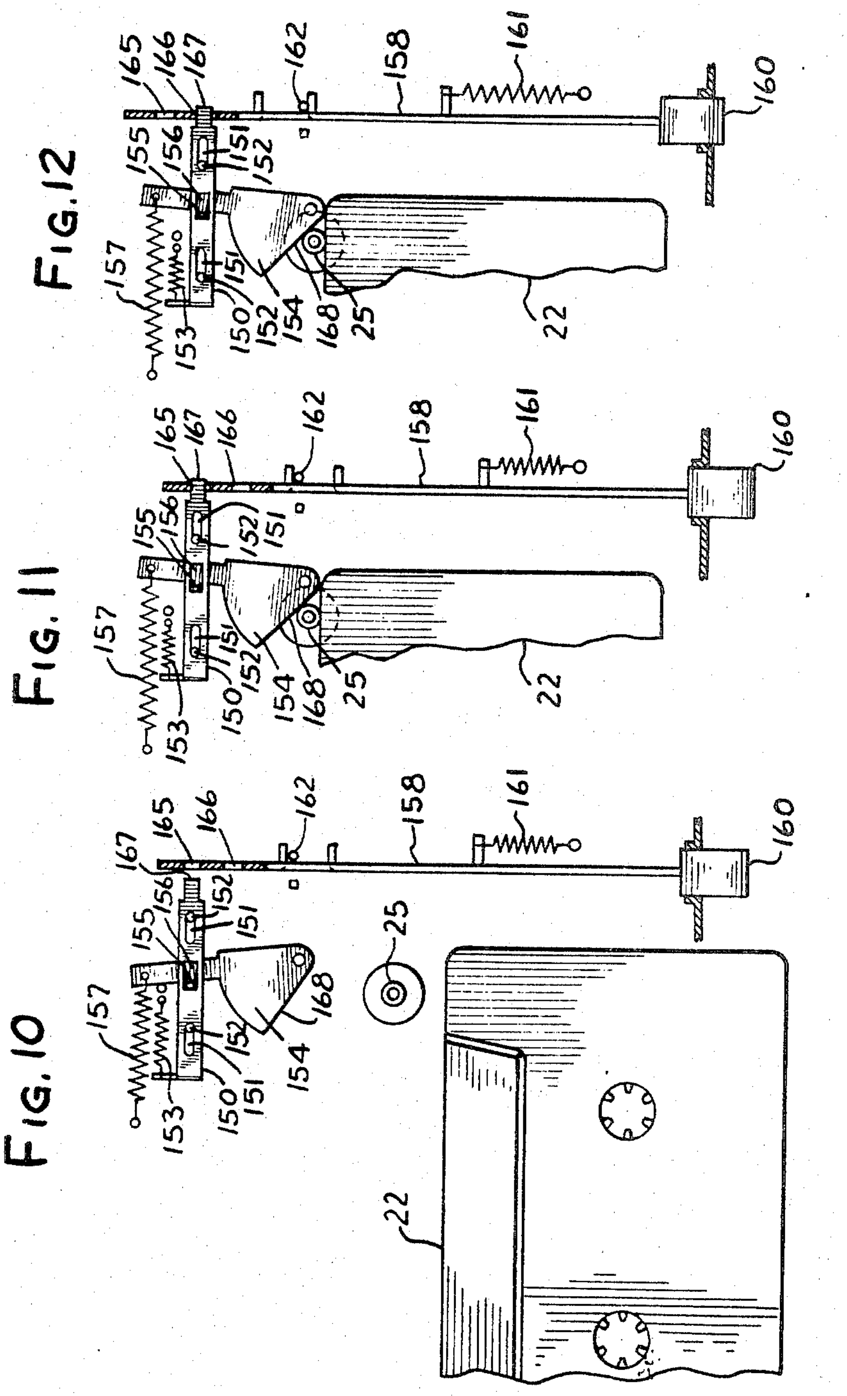
FIG. 10 is a fragmentary partial section of the recording function switch lockout mechanism of the present invention, with the switch contact mechanism and associated electronics being omitted for clarity.
FIG. 11 is a fragmentary partial section similar to FIG. 10 illustrating the lockout as engaged during playback operation.
FIG. 12 is a fragmentary partial section similar to FIG. 10 in which the lockout mechanism is shown as engaged during recording.

A third embodiment of the present invention is illustrated in FIGS. 10, 11 and 12. As applied to this embodiment, the invention comprises a recording mode lockout which is effective to prevent the engagement of the electronic function of recording without deliberate and conscious intent by the operator to do so. In addition, this embodiment is effective to automatically disengage the recording mode electronics upon shifting of the drive carriage 23 from the operating position (FIG. 1) to the intermediate position for rapid tape transport (FIG. 4), or from the operating position to the released position in which the cartridge may be removed and a new cartridge inserted.

In carrying out this embodiment of the invention, a shiftable crossbolt 150 is provided on the chassis 20 which is laterally shiftable relative to the frame of the tape deck. The crossbolt 150 is slidably retained by elongate holes 151 which engage corresponding pins 152 on the chassis 20. While the crossbolt 150 is normally urged to the right (as viewed in the figures) by a spring 153, this movement is restrained by a shifting link 154 which carries a pin 155 engageable with another elongate hole 156 in the crossbolt 150. The shifting link 154 is normally urged by another spring 157 in opposition to the force exerted on the crossbolt 150 by the spring 153. In accordance with the invention, the spring 157 is made relaitvely stronger than the spring 153, causing the latter to be overbalanced and the crossbolt 150 to thus normally be retained in the position shown in FIG. 10.

The electronic function of the tape deck is shifted from the normal playback function to recording by a switch (not shown) which is actuated through an actuating bar 158 which is, in turn, controlled by a push-button 160. A return spring 161 tends to urge the actuating bar 158 and push-botton 160 outwardly toward the operator, with the motion of the bar 158 being restrained by a stop 162. The actuating bar 158 carries two holes 165, 166, in which a corresponding lug 167 on the end of the crossbolt 150 is selectively engageable. When engaged, the crossbolt 150 effectively prevents motion of the actuating bar 158 in any direction, thereby locking the record switch in whatever position it happens to be in at the time of engagement.

In operation, the crossbolt 150 is caused to lock the movement of the actuating bar 158 by a cam surface 168 on the shifting link 154. The surface 168 is engageable with an abutment, which in this instance is the upright lug 25 of the drive carriage 23 as it slides along its slot in the chassis 20 during the shifting of the drive carriage as previously described. As illustrated in FIG. 10, the drive carriage 23 is in the released position with a cartridge 22 being shown only partially inserted. In this configuration, the cross bolt 150 is withdrawn to the left (as viewed in the figures) by the action of the spring 157. The weaker spring 153, which would otherwise tend to draw the crossbolt into engagement with the hole 165, is thereby overbalanced. As the cartridge 22 is inserted further, it engages the upright lug 25 and causes it to slide toward the rear of the chassis 20 in bringing the drive carriage 23 up into operating engagement with the cartridge. As the lug 25 engages the cam surface 168 of the shifting link 154, it rotates the shifting link to the right against the force of the spring 157, allowing the spring 153 to draw the crossbolt into locking engagement with the actuating bar 158. The action of the pin 155 on the shifting link 154 in the elongate hole 156 of the crossbolt 150 serves as a lost-motion linkage, allowing the shifting link 154 to swing further under the urging of the lug 25, while the lug 167 of the crossbolt 150 remains seated in one of the holes 165, 166 of the actuating bar 158.

During normal operation, when the tape is being played back, the recording push-button 160 would not be touched during insertion of the cartridge 22 into operating position. The crossbolt 150 is thereby shifted laterally so that the lug 167 seats in the hole 165, effectively locking out the actuating bar 158 and associated recording switch so that the recording electronics cannot be placed in operation so long as the drive carriage is not again shifted. The interlock is maintained until the drive carriage 23 is shifted either by the action of the operator in deliberately releasing the drive carriage 23 to effect release of the cartridge 22, or by actuation of either the rewind or fast forward modes of operation which cause a similar shift of the drive carriage 23 sufficient to withdraw the lugs 25 by an amount which retracts the lug 167 from the actuator bar 158.

When it is desired to record, the drive carriage 23 is first shifted to its released position, and the record push-button 160 is actuated to engage the recording electronics, while the cartridge is simultaneously re-inserted to latch the drive carriage 23 back in operating position. As shown in FIG. 12, this causes the crossbolt 150 to shift laterally and re-engage the actuator bar 168, but this time in the second hole 166. When the recording push-button 160 is then released by the operator, the lug 167 effectively prevents the actuator bar 158 from being returned under the action of the spring 161, and the tape deck continues to operate in the record mode. All that need be done to disengage the record function from this configuration is to momentarily shift the drive carriage 23 from the operating position, which causes the crossbolt 150 to retract to the left, disengaging the lug 167 from the hole 166, allowing the return spring 161 to draw the actuator bar 158 to the normal or playback position. In this position the recording electronics are rendered ineffective until deliberately returned to operation by the operator through simultaneous actuation of the push-button 160 and shifting of the drive carriage 23 to the operating position as previously described.

In a further embodiment of the invention, referring to FIGS. 13–18 a latching mechanism is provided to hold the drive carriage of the tape deck in the released position and against unwanted shifting movement. It is contemplated that the tape deck may be employed in vehicles such as automobiles, in which case the unit may be arranged with the tape deck in a horizontal position. In the absence of means to restrain the drive carriage against movement, a sudden stop of the vehicle can cause the drive carriage to shift horizontally forward from its released position toward the operating position against the force of the springs 24 normally restraining the drive carriage against such motion and tending to hold the drive carriage in the released position. It is also contemplated that the tape deck may be used in portable sound equipment, and may be carried around in a case with the tape deck in a vertical position. Any jouncing of the carrying case while the unit is being carried in this manner can cause the drive carriage to bounce up and down hanging from the springs 24 unless means is provided to hold the drive carriage against such motion. Other uses are contemplated for the tape deck which may involve motion of the deck bringing rise to unwanted movement of the drive carriage and it is a feature of the present embodiment of the invention to hold the drive carriage of the tape deck while in the released position firmly against such unwanted motion.

Figure 13:
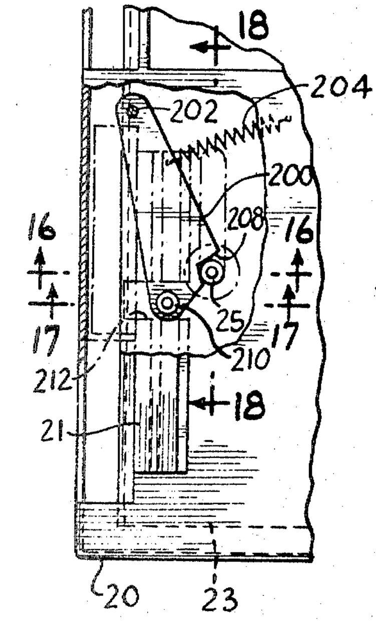
FIG. 13 is a fragmentary plan view with parts broken away and other parts omitted for clarity, illustrating a latching mechanism engaged to hold the drive carriage in the released position.

Referring to FIG. 13, the drive carriage 23 is held in its released position by springs 24. To latch the drive carriage so it is locked from undesired movement against the pull of the springs, in keeping with this form of the invention, a latching element 200 is pivotally mounted on the frame 20, and is urged by a spring 204 anchored to the frame inward towards the center of the tape deck and into latching engagement with means, herein shown as the lug 25, carried by the shiftable drive carriage 23. To enhance the locking action, the latching element is notched to present a shoulder 208 having a progressively increasing radius relative to the axis of pivotal support of the latching element provided by the pin 202. With the latching element 200 urged by the spring 204 into engaged position, the lug 25 on the left side of the drive carriage (as viewed in plan in FIG. 1) is seated in the bottom of the notch in the latching element and abuts the shoulder 208, the carriage being held thereby against forward movement.

Figure 14:
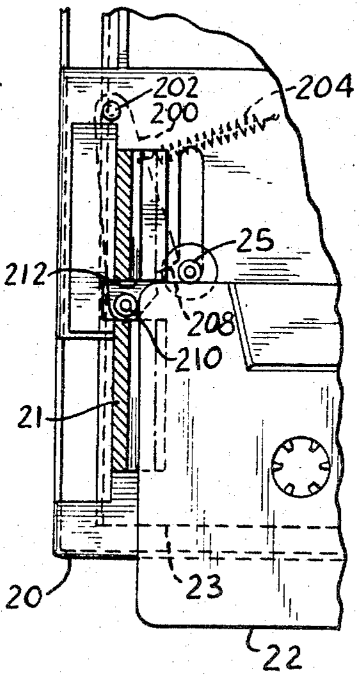
FIG. 14 is a fragmentary plan view with parts broken away and other parts omitted for clarity, illustrating the latching mechanism being disengaged by insertion of the cartridge.
Figure 15:
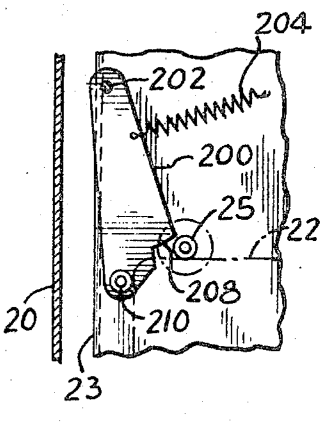
FIG. 15 is a view similar to FIG. 14 with additional parts omitted or broken away to show the latching element more clearly.
Figure 16:
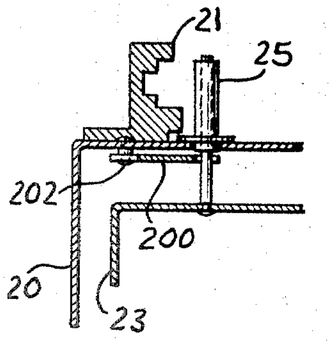
FIG. 16 is a sectional view of the latching mechanism taken substantially in the plane of lines 16—16 in FIG. 13.
Figure 17:
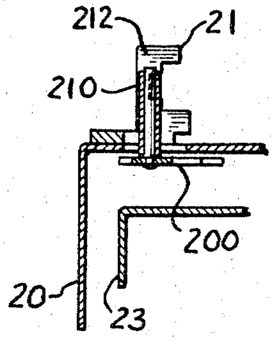
FIG. 17 is a sectional view of the latching mechanism taken substantially in the plane of lines 17—17 in FIG. 16.
Figure 18:
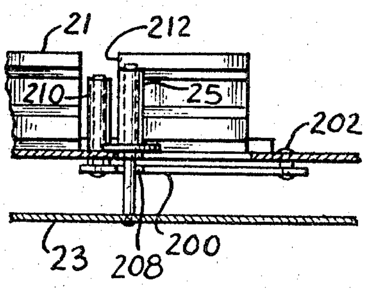
FIG. 18 is a sectional view of the latching mechanism taken substantially in the plane of lines 18—18 in FIG. 16.

In order to release the drive carriage for movement to the operating position, the latching element 200 is provided with an upstanding lug 210 which stands in the path of movement of the tape cartridge when it is inserted into the tape deck. Referring to FIGS. 14 and 15, it will be seen that as the tape cartridge is inserted by sliding it along the guides 21, one forward rounded corner of the cartridge engages the lug 210 forcing the latching element 200 to one side and away from the pin 25 fastened to the drive carriage. In this manner the pin 26 is released, allowing the drive carriage to move forward with the cartridge to the operating position of FIG. 1. Referring also to FIGS. 16–18, the left-hand guide 21 (as viewed in FIG. 1) is provided with a recess 212 which is entered by the lug 210 on the latching element as the latter is pivoted to one side to allow the cartridge to enter the tape deck, as shown in FIG. 14.

I claim as my invention:

1. In a tape deck for use with self-contained tape cartridges, said deck having a fixed frame member having guide means for receiving and locating a tape cartridge in a single lateral plane, a drive carriage member having drive component means mounted thereon for controllably moving the tape from reel to reel within the cartridge, and suspension means for locating the drive carriage member in a plane parallel to the plane of the cartridge and for guiding the drive component means for vertical upward movement to engage the cartridge in an operating position, a drive carriage latching mechanism comprising, in combination, a latch member carried by said frame member for movement to and from a latching position, means carried by said drive carriage member when in its released position for engagement by said latch when in its latching position so as to hold the drive carriage member against displacement from said released position, said means including a notch in said latch and a pin carried by said drive carriage member for engagement with said notch when the latch is in the latching position, and disengagement means for shifting said latch to unlatch said drive carriage member upon insertion of a tape cartridge into the tape deck and movement thereof toward its operating position.

2. A latching mechanism according to claim 1 in which said notch defines a shoulder having a progressively greater radius from the axis of pivotal support for said latch member, to encourage the locking action of said latch member against the pin.

3. In a tape deck for use with self-contained tape cartridges, said deck comprising a fixed frame member having guide means for receiving and locating a tape cartridge in a single lateral plane, a drive carriage member having drive component means mounted thereon for controllably moving the tape from reel to reel within the cartridge, and suspension means for locating the drive carriage member in a plane parallel to the plane of the cartridge and for guiding the drive component means for vertical upward movement to engage the cartridge in an operating position and a position of momentary retraction, the cartridge having a takeup reel spindle and a supply reel spindle, an operating mechanism comprising, in combination, a shiftable link carried by the drive carriage member, a camming surface carried by the fixed frame member, said camming surface having a profile defined by two peaks flanking a depression, a follower for following said camming surface profile and translating following motion to said shiftable link, and a reel brake carried by said shiftable link and arrestingly engageable with said supply reel spindle. said follower being positioned on one peak when the drive carriage member is in the operating position, and on the other peak when the drive carriage member is retracted to allow fast tape transport between supply and takeup reels, whereby the reel brake is operative to arrest the supply reel spindle in a transitional position of the drive carriage between said operating position and said retracted position.

4. In a tape deck for use with self-contained tape cartridges, said deck having a fixed frame member having guide means for receiving and locating a tape cartridge in a single lateral plane, a drive carriage member having drive component means mounted thereon for controllably moving the tape from reel to reel within the cartridge, and suspension means for locating the drive carriage member in a plane parallel to the plane of the cartridge and for guiding the drive component means for vertical upward movement to engage the cartridge, and sound reproduction means including a mode switch for selective operation in a predetermined one of a plurality of operating modes, a recording function switch lockout mechanism comprising, in combination, a shiftable crossbolt having a lug at one end, a switch operating bar having openings for receiving the crossbolt lug, resilient means for urging the switch operating bar to disengage the recording function when not retained by the crossbolt lug, linkage means on said frame for engaging the shiftable crossbolt to insert the crossbolt lug into one of the openings in the switch operating bar, and an abutment on said drive carriage member for moving said linkage means for such engagement when the carriage is shifted to its operating position.

References Cited

UNITED STATES PATENTS

| | | | |
|---|---|---|---|
| 3,254,858 | 6/1966 | Camras | 242—55.13 |
| 3,146,316 | 8/1964 | Knoth. | |
| 3,080,101 | 3/1963 | Kreithen et al. | 226—174 |
| 2,951,914 | 9/1960 | Dubois | 274—4 |
| 2,867,389 | 1/1959 | Viets | 274—4 |

LEONARD FORMAN, Primary Examiner

R. A. FIELDS, Assistant Examiner

U.S. Cl. X.R.

242—55.13